C. T. MYERS.
VEHICLE BRACKET LUBRICATOR.
APPLICATION FILED AUG. 23, 1919.
1,387,295.
Patented Aug. 9, 1921.
3 SHEETS—SHEET 1.
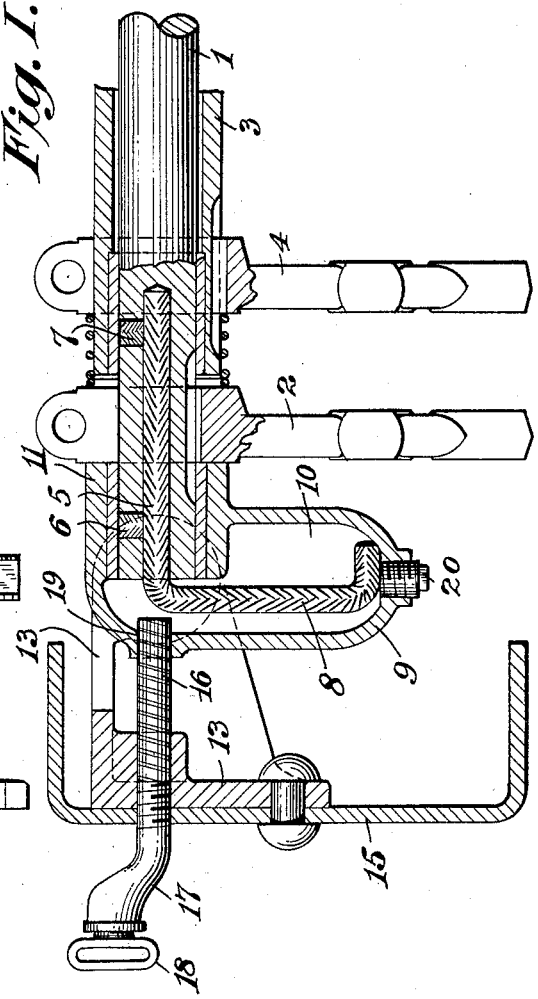
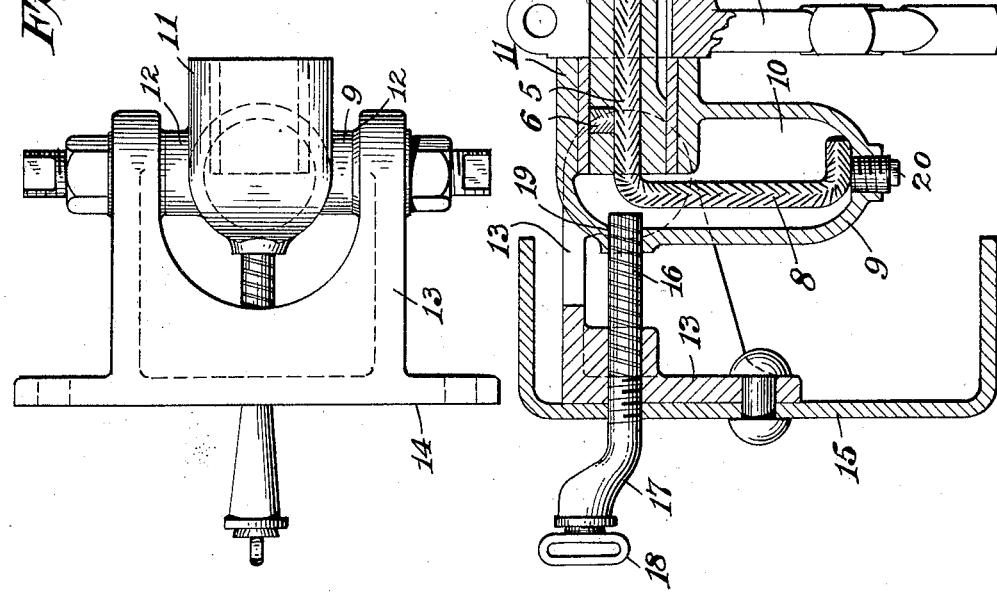
Inventor
CORNELIUS T. MYERS
By his Attorney

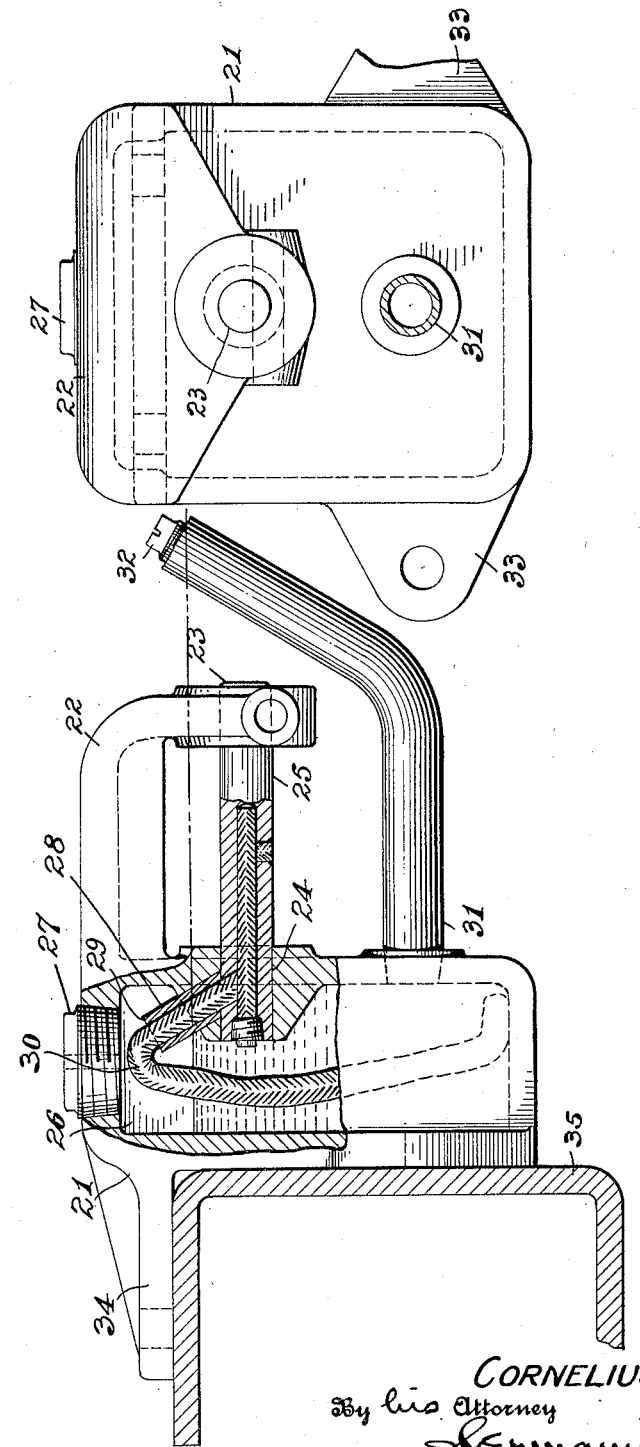

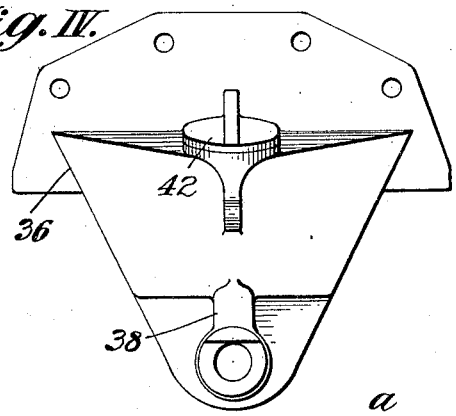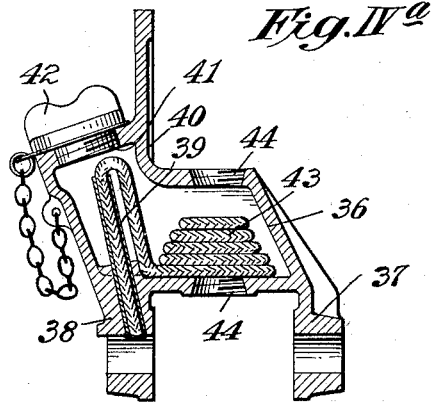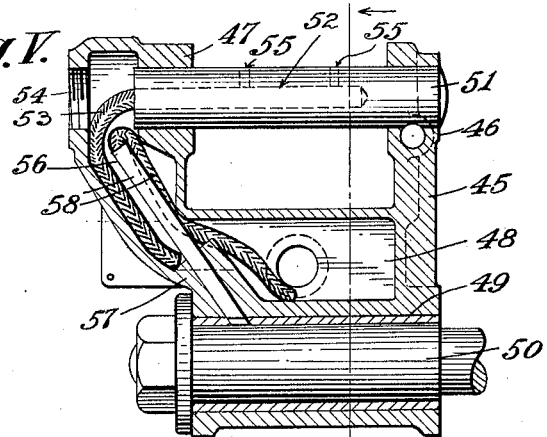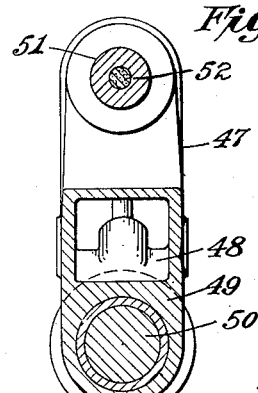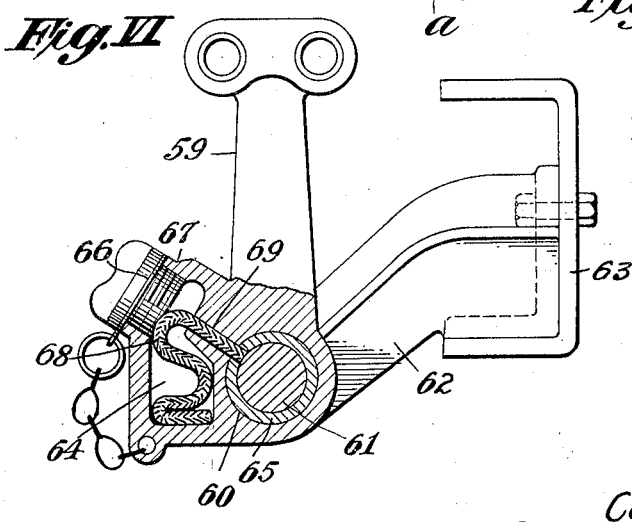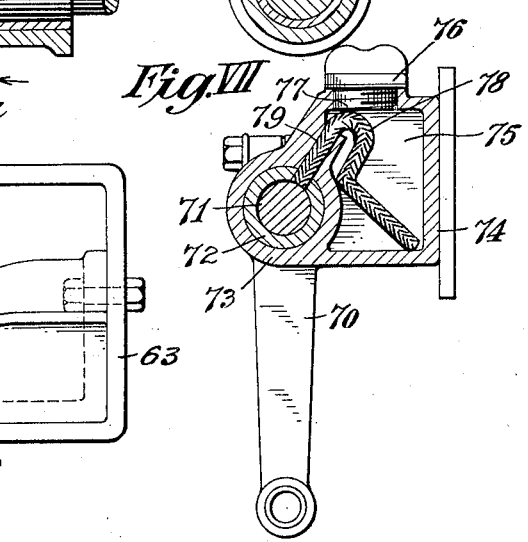

UNITED STATES PATENT OFFICE.

CORNELIUS T. MYERS, OF AVENEL, NEW JERSEY.

VEHICLE-BRACKET LUBRICATOR.

1,387,295. Specification of Letters Patent. Patented Aug. 9, 1921.

Application filed August 23, 1919. Serial No. 319,513.

*To all whom it may concern:*

Be it known that I, CORNELIUS T. MYERS, a citizen of the United States, resident of Avenel, county of Middlesex, State of New Jersey, have invented certain new and useful Improvements in Vehicle-Bracket Lubricators, of which the following is a specification, reference being had to the accompanying drawings, illustrative of one particular embodiment of my invention.

The object of my invention is to provide lubrication of brake rods, spring bolts, floating levers, linkage shafts or various bracket bearings, particularly on motor vehicles, and in the various places where oscillating movement as distinguished from a running shaft, introduced conditions which heretofore it has attempted to serve by way of grease or grease cups. The uncertain and insufficient lubrication in the past is due to various deficiencies which are overcome by the proper application of my invention. Such oscillating shafts or reciprocating bearings when insufficiently lubricated, involve wear with resultant rattling, squeaking and emphasized vibration, and frequently in a break down of the parts. I meet the particular conditions of lubrication of such members by the embodiment of an ample oil or other suitable lubricant reservoir embodied in the bracket or in the bearing member, preferably forming an integral device cast, or otherwise formed with the bearing or bearing support oil reservoir and the other coöperating elements as a unit member,— ready to apply or secure, as a whole, to the vehicle frame or other supporting member. The resultant article as a unit is simple, durable, economical in production, and above all reliable and efficient in its lubricating function. Its saving of wear represents a great economy in operation, in particular.

I have illustrated particular forms of my invention in the accompanying drawings, in which:

Figure I is a vertical section on the axis of a control shaft bearing and bracket.

Fig. II is a plan of the oiling connection and supporting bracket as embodied in Fig. I.

Fig. III is a side elevation, in fragmentary section, of a vehicle frame spring bracket; Fig. III^A is an end view of the bracket shown in Fig. III.

Fig. IV is a side elevation of the modified form of spring bracket; Fig. IV^A is a vertical section of the bracket shown in Fig. IV on the axis of the spring bolt bearing.

Fig. V is a vertical section of a spring shackle on the axis of the shackle bolts.

Fig. V^A is a vertical section transverse to the axis of the bolts in Fig. V on the line *a—a*.

Fig. VI is a side elevation, with fragmentary section, of a floating lever embodying my invention.

Fig. VII is an elevation of control rod bracket with the bearing and oil chamber in section.

In Fig. I a control rod 1 has keyed to it lever 2, and is surrounded by control tube 3 having keyed to it lever 4. The end of shaft 1 has the axial counterbore 5, with radial oil openings 6—7. A wick 8 is snugly fitted into the counterbore 5. The end of the shaft and the wick 8 are inclosed in the bracket 9, which embodies a lubricant chamber 10 and integral therewith the bearing 11. On each side of the bracket 9 projecting lugs 12—12 are supported in the frame bracket 13, having a base 14 adapted to be secured to a frame member such as the channel 15. Through the bracket 13 a tube 16 connects to the outside of the channel 15 to a filling pipe 17, with a suitable readily-removable cap 18,—and at the opposite end passes through an opening 19 in the wall of the bracket 9, terminating in close proximity to the wick 8, opposite its entrance into the counterbore 5. At the bottom of the reservoir 10, a plug 20 serves to drain and clean the lubricant chamber.

In Figs. III and III^A a bracket 21, with an overhanging arm 22 provides bearings 23—24, to carry a spring bolt 25. Bearing 24 is integral with the wall of the chamber 26, which is formed in the bracket with a top opening for supplying the lubricant and a plug 27 as a suitable closure therefor. A tube 28 is set into a hole in the wall of the chamber carrying to the bearing 24, and with its upper end 29 terminating adjacent to the opening at the top of the reservoir. Wick 30 is stuffed into the tube 28 which, for this purpose, is accessible through the opening at the top of the reservoir. Near the bottom of the reservoir a tube 31 is inset and leads beyond the over-hanging bracket 22, terminating and capped with a plug 32, at a level with the desired level of oil or lubricant in the reservoir. Suitable flanges 33—34 formed integral with the reservoir and the bearing serve to secure the bracket to the channel iron 35.

In Figs. IV and IV^A, a modified form of bracket to support a spring bolt comprises the chamber 36, the walls of which are integral with the bearings 37—38. The tube 39 is fitted to a hole in the bracket wall leading to the bearing 38, while the upper end of the tube 40 terminates in close proximity to the opening 41 at the top of the lubricant chamber, with the closure formed by the wing-nut plug 42. The wick is thus inserted in the end 40 of the tube, being for this purpose readily manipulated through the opening 41, and after insertion the balance of the wick is disposed in the lubricant chamber which, as shown, accommodates, as coiled at 43, a sufficient length of wick to absorb a large amount of lubricant for the purpose as hereinafter shown. The core plugs 44 at the top and bottom of the oil reservoir serve for cleaning purposes, having provided for proper core supporting when the casting is made.

In Figs. V and V^A the spring shackle 45 has the upper bearings 46—47 formed integral with the walls of the chamber 48, and below the chamber a bearing 49 provides for engagement with the supporting shackle bar 50. The shackle bolt 51 has a counterbore 52 and radial oil holes, and a wick 53 is introduced in the end of the counterbore opposite the opening 54 in the wall of the shackle. In the radial oil holes 55 small wicks project to the surface of the bolt and contact with the wick through the core for feeding of the lubricant. A tube 56 extends from the proximity of the opening 54 to a hole in the body of the bracket at an enlargement 57, and is so arranged as to receive a wick 58 inserted from the upper end through the opening 54, after which the surplus of wick is deposited in the lubricant chamber and disposed in a manner to absorb and feed the lubricant from the chamber irrespective of the amount of oil. When the chamber is full the capillary feed through the wick is properly controlled by the fit of the wick in the tube and is carried down to the bearing shackle bar 50. The wick is so disposed that it will convey the entire contents of the lubricant reservoir to the bearing surfaces.

In Fig. VI the floating lever 59 carries the bearing part 60 oscillating on the shaft 61, supported by or comprising a part of the bracket 62, which is carried by a frame member 63. The floating lever boss embodies lubricant chamber 64 integral with the bearing part, while a bushing 65 or other suitable anti-friction surface forms the direct bearing on the shaft. A closure 66 for the hole 67 provides for ingress to the oil chamber 64, and immediately opposite the opening 67 a wick 68 is accommodated by a suitable guide hole 69 leading to the bearing surface.

Fig. VII shows a control or brake lever 70 carried by shaft 71 in a bearing 72, comprising a bushing secured in the bearing part of the bracket 74, which is formed with the chamber 75 as a cavity in the integral bracket walls and bearing part. Similarly in this form a closure 76 serves to open or close at will the hole 77 in the integral wall of the bracket forming the top of the chamber 75, and a wick 78 is inserted through a hole 79 in the body of the bracket, which hole terminates adjacent to the opening 77 and at or above the top of the level of the oil in chamber 75.

It will thus be seen that the form of bearing for break or control shaft, shown in Figs. I and II, provides a lubricant chamber 10 integrally embodied with the portion 11 carrying the bearing, while a bushing may be inserted as desired, but the integral construction of bearing support portion and lubricant chamber comprises an article of simple construction with little or no liability to disarrangement, with complete protection for the lubricant feed, and above all a manner of providing the lubricant exactly where desired and its feed as fast as required from an ample supply requiring very infrequent replenishing. The tube 16 with the filling funnel 17, afford accessibility for the replenishing of the lubricant with the greatest facility. The counterbore carrying the wick to any extent desired through the core of the reciprocating shaft, reaches the radial oil feeds 6—7, which may contain wicks which carry the lubricant by capillary action directly to the friction surfaces.

The spring bolt bracket shown in Figs. III and III^A, provides a single or unit casting with an ample fuel reservoir 26 with the supporting member 28 carrying the oil to the bolt 25 to its bearing surface supporting the reciprocating bearing at the spring end. The wick tube 28 is located so that it terminates at 29 in close proximity to the relatively large closure 27, in order that the removal of the plug will permit accessibility to the wick guide, whereby the wick may be readily and properly inserted to insure its prescribed function. In this form the supplementary feed pipe 31 may be carried out to any position, to meet the particular requirements of the design and location of the adjacent vehicle members. As shown, the end of the supplementary feed tube has an opening with plug 32 in a position determining the maximum level of the lubricant. When filled through this supplementary pipe 31, a small vent through plug 27 permits the air escape and the rise of lubricant in the chamber 26. The oil chamber as here shown is an integral part of the brackets and bearing supports, and is so protected that it cannot be dislodged, but remains a sure and certain source of lubricant supply unless the entire bearing and other members are broken away by accident. In this particular form, even should the supplementary feed pipe 31 be broken, a sufficient amount of lubricant will remain in the wick and in the bottom of the reservoir for continued lubrication of the bearing for an ample period to permit the detection of any such damage, before any injury can possibly result to the bearing itself.

In the form shown in Figs. IV and IV$^A$, the bracket is adapted to be disposed at the underside of a frame channel member, feeding the oil to the spring bolt supports, while the relatively large oil reservoir is well disposed for protection against any breakage, but with ample provision for replenishment and for ready insertion of wick and insuring the feeding of lubricant to the very last particle of oil in the reservoir.

In the spring shackle shown in Figs. V and V$^A$, the lubricant chamber serves as a magazine for the supporting shackle bar through which it feeds downward through the wick guide tube, and another wick feeds upward to the shackle bolt 51 carrying lubricant to its surface. Likewise in this case, ready replenishing of fuel is provided for with accessibility for the proper insertion of the wicks, and the reservoir walls integral with the remaining parts of the shackle insure the protection and preservation of the oil reservoir so long as the entire shackle remains intact. That is, the reservoir cannot be broken away except with substantial destruction of the shackle. It will be noted in the various forms herein shown and fully described, the walls of the reservoir containing the oil supply, that is the oil reserve, constitute portions of the supporting structure and are intermediate members between the bearings to be lubricated and the attaching parts of the structure. Where the lubricating chamber with its feeding means is associated with a bracket bolted or riveted to a supporting member the reservoir or supply-reservoir walls constitute the link or connection, in whole or part, between the attaching flange or flanges and the bearing or bearings or their supports. The embodiment of these structural features involves a robust, or structurally substantial part, thereby insuring the preservation of the oil supply-reservoir so long as the bracket and bearings remain intact.

Such embodiment also involves the location of the cavity or supply-reservoir, so-to-speak, within the structure as distinguished from an excrescence,—such as the heretofore added oil cups which project in a manner courting easy destruction.

In the case of the floating lever shown in Fig VI, the oil reservoir is embodied integrally in the boss or adjacent the hub of the lever, with an ample, accessible supply opening at the top of the oil chamber, and a wick guide hole near the top of the chamber and accessible to the supply opening. In Fig. VII the oscillating shaft 71 with its lever 70 are supported in a bracket attached in any usual manner to the desired vehicle supporting member,—but with the oil chamber formed integral in the bracket and with a top opening of ample size and a wick guide to the bearing so located as to insure feed from the top and the proper insertion of the wick.

It will be seen that in the various arrangements provision is made for the absorption of the lubricant by the wick from the bottom of the reservoir, so that the capillary movement of the lubricant is assured to the last remaining lubricant in the chamber. The feed through the wick rises until the wick passes into the guide, which may be the tubes shown or a suitable hole drilled through the integral part of the device, but in every case the arrangement is such as to feed lubricant and prevent sediment or any foreign matter from passing to the bearing surface. The replenishing of the fuel chamber may be easy and the wick made accessible not alone for proper insertion, but for inspection. The character of wick and the size are provided to suit the particular case and the rate of feed of lubricant desired, but in all cases its insertion, whether packed tight or loose, is provided for in a most advantageous manner.

While many variations may be made from the particular embodiments of my invention herein shown and described, what I claim and desire to secure by Letters Patent is:

1. A fitting for a vehicle frame adapted to support a reciprocating surface friction member, comprising, integrally associated, a bearing, a load supporting or attaching member and intermediate connections forming a lubricant supply-reservoir, a filling opening for said reservoir and a closure therefor, means to convey a controlled supply of lubricant from the reservoir to bearing including a guide terminating in a position accessible from the filler opening.

2. A vehicle bracket lubricator having a lubricant supply chamber and integrally associated therewith a bearing member to be lubricated, supporting member for said bracket integrally formed with the supply-chamber walls, an opening to said chamber for supplying oil thereto and a closure therefor, means to convey a controlled supply of oil from said chamber to the bearing including a guide for said means extending in proximity to the supply opening of the chamber and terminating in a position accessible from said opening.

3. A lubricating bracket for a reciprocating surface bearing, comprising a base or means for mounting said bracket and integrally associated therewith, walls of a lubricant supply-chamber, a bearing surface, an oil hole connecting the bearing with the chamber and terminating above the normal oil level in the chamber, said terminal being in a position accessible to a supply opening in the chamber, for the purpose described.

4. A bracket for a reciprocating surface friction member, comprising a rigidly combined oil supply-reservoir and a securing base, a bearing supported from the base by the walls of said reservoir, means to convey a controlled supply of oil from the chamber to the bearing member, said means including a vent extending from the bearing to a position above the normal level of the oil in the chamber and a supply opening for said chamber located in proximity to the upper end of said vent, for the purpose described.

5. A fitting of the class described, comprising integrally associated a supporting member carrying surface extensions forming walls of an oil supply-reservoir, a surface bearing carried by the reservoir walls, an oil connection from the upper part of the oil chamber to the surface bearing through the integral part of the fitting, said oil connection terminating in close proximity and accessible through a fitting opening in the top of the lubricant chamber and a control means for feeding the lubricant from the bottom of the chamber through the integral wall to the bearing surface.

6. A lubricating bracket for a reciprocating surface bearing, comprising a supporting member to carry the load on said bracket, integral members extending from said support and surrounding a lubricant supply-reservoir, a bearing supported by the walls of said reservoir and means of controlled lubricant feed from the reservoir to the bearing.

7. A fitting for a vehicle frame adapted to carry a reciprocating surface friction member, comprising a supporting member for rigid attachment to the frame, a bearing support and an intermediate oil supply-reservoir having walls integrally embodied as part of the structural support between the bearings and the member attaching the fitting to the frame, a replenishing opening for the reservoir in one of the supporting walls and feed connections between the reservoir and the bearing.

8. A fitting for a vehicle frame adapted to carry a surface friction part, comprising a supporting member for rigid attachment of the fitting, a bearing support, intermediate members forming a cavity adapted to surround a lubricant supply-reservoir, said intermediate members being integrally embodied as part of the structural support between the bearings and the member for attachment and support of the fitting.

9. A lubricating bracket for a surface bearing comprising an attaching member for supporting the load on said bracket, part of said bracket provided for support of the bearing, intermediate connections carrying the load from the bearing to the supporting part bracket including walls forming a protective cavity adapted to surround a lubricant supply-reservoir, means for conducting lubricant from said cavity to the bearing.

In testimony whereof I have signed my name to this specification in the presence of two subscribing witnesses this 15th day of August 1919.

CORNELIUS T. MYERS.

Witnesses:
HERMAN F. CUNTZ,
H. MUCHMORE.